(12) United States Patent
Elias

(10) Patent No.: US 8,628,097 B1
(45) Date of Patent: Jan. 14, 2014

(54) TRANSPORT SYSTEM

(76) Inventor: Theresa A. Elias, Phoenix, AZ (US)

( * ) Notice: Subject to any disclaimer, the term of this patent is extended or adjusted under 35 U.S.C. 154(b) by 36 days.

(21) Appl. No.: 13/396,049

(22) Filed: Feb. 14, 2012

Related U.S. Application Data

(60) Provisional application No. 61/463,449, filed on Feb. 17, 2011.

(51) Int. Cl.
*B62B 1/00* (2006.01)

(52) U.S. Cl.
USPC ........................................ 280/79.2; 280/79.11

(58) Field of Classification Search
USPC ........ 280/79.11, 79.2, 79.7, 79.5, 47.131, 35, 280/47.34, 654
See application file for complete search history.

(56) References Cited

U.S. PATENT DOCUMENTS

| | | | | |
|---|---|---|---|---|
| 1,561,122 A | * | 11/1925 | Stahl | 280/35 |
| 3,754,773 A | * | 8/1973 | Bruno | 280/47.131 |
| 3,889,965 A | * | 6/1975 | Zeitlin | 280/47.131 |
| 3,889,966 A | * | 6/1975 | Zeitlin | 280/47.131 |
| 4,166,638 A | | 9/1979 | DePrado | |
| D296,144 S | * | 6/1988 | Baker | D34/23 |
| 5,879,014 A | | 3/1999 | Price | |
| 6,382,643 B1 | * | 5/2002 | Baker | 280/79.11 |
| D491,368 S | * | 6/2004 | Koenig et al. | D3/318 |
| 6,923,468 B1 | | 8/2005 | Barnett | |
| 6,974,140 B2 | * | 12/2005 | Neuman | 280/79.11 |
| 7,644,964 B2 | * | 1/2010 | Bushey et al. | 292/342 |

* cited by examiner

*Primary Examiner* — Hau Phan
(74) *Attorney, Agent, or Firm* — Emery L. Tracy

(57) ABSTRACT

A transport system for transporting an item is provided. The transport system comprises a first plate and a second plate with each having a first side and a second side. A first side wall and a second side wall mounted between the first plate and the second plate with a sleeve opening created by the first plate, the second plate, the first side wall, and the second side wall. A plurality of wheels is mounted to the second plate. A strap is positionable around the item and within the sleeve opening with a tensioning device movable within the sleeve opening for releasably securing the strap. Upon positioning the item on the first side of the first plate, the strap releasably secures the item to the transport system.

16 Claims, 1 Drawing Sheet

TRANSPORT SYSTEM

The present application claims the benefit of priority of pending provisional patent application Ser. No. 61/463,449, filed on Feb. 17, 2011, entitled "Portable Wheels".

BACKGROUND OF THE INVENTION

1. Field of the Invention

This invention relates generally to a transport system and, more particularly, the invention relates to a transport system for transporting heavy and bulky objects.

2. Description of the Prior Art

The most common type of non-fatal occupational health injuries involving lost-work days are sprains, strains and tears. Overexertion injuries are the result of excessive lifting, pushing, pulling, holding, carrying, or throwing an object. Considered musculoskeletal disorders (MSDs), these injuries involve the nerve, tendons, muscles, and supporting structures of the body. Back strain occurs when the muscle, ligaments and/or tendons in the back are damaged due to overstretching or overuse of the muscles in the back, resulting in strains, sprains and tears. Herniated disks are also a type of back injury found in workplace situations. To avoid workplace back injury, companies can implement an ergonomics program that focuses on redesign of the work environment and work tasks to reduce the hazards of lifting. In achieving this, a company can adjust the height at which the object or materials are retrieved or deposited, and implementing mechanical aids, such as hoists or adjusted lift tables, to reduce the need to bend, reach, and twist.

SUMMARY

The present invention is a transport system for transporting an item. The transport system comprises a first plate having a first side and a second side and a second plate having a first side and a second side. The second plate is spaced from the first plate with the first side of the second plate facing the second side of the first plate. A first side wall is mounted between the first plate and the second plate. A second side wall is spaced from the first side wall and mounted between the first plate and the second plate. A sleeve opening is created by the first plate, the second plate, the first side wall, and the second side wall. A plurality of wheels is mounted to the second side of the second plate. A strap is positionable around the item and within the sleeve opening. A tensioning device is movable within the sleeve opening for releasably securing the strap between the tensioning device and the second side of the first plate. Upon positioning the item on the first side of the first plate, the strap releasably secures the item to the transport system.

In addition, the present invention includes a method for constructing a transport system for transporting an item. The method comprises providing a first plate having a first side and a second side, providing a second plate having a first side and a second side, spacing the second plate from the first plate, facing the first side of the second plate toward the second side of the first plate, mounting a first side wall between the first plate and the second plate, mounting a second side wall between the first plate and the second plate, spacing the first side wall from the second side wall, creating a sleeve opening by the first plate, the second plate, the first side wall, and the second side wall, mounting a plurality of wheels to the second side of the second plate, positioning a strap around the item and within the sleeve opening, moving a tensioning device within the sleeve opening, and releasably securing the strap between the tensioning device and the second side of the first plate.

DETAILED DESCRIPTION OF THE PREFERRED EMBODIMENTS

Figure 1:
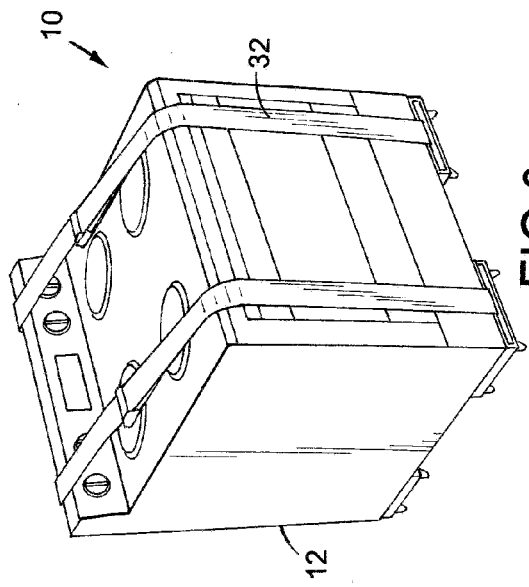
FIG. 1 is a perspective view illustrating a transport system, constructed in accordance with the present invention.
Figure 2:
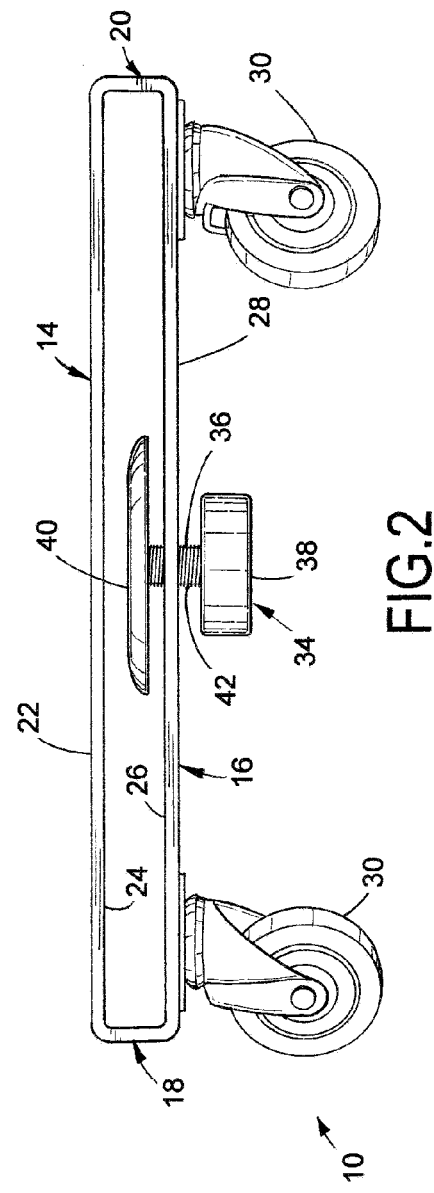
FIG. 2 is an elevational side view illustrating the transport system, constructed in accordance with the present invention.
Figure 3:
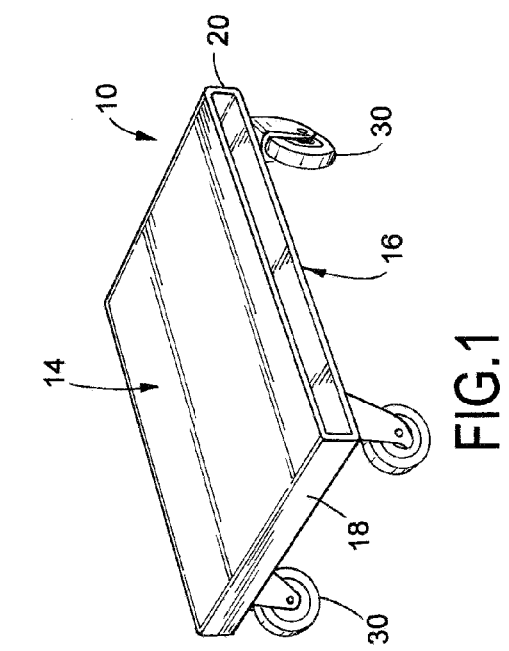
FIG. 3 is a perspective view illustrating the transport system, constructed in accordance with the present invention, with a plurality of transport systems being used to transport an object.

As illustrated in FIGS. 1-3, the present invention is a transport system, indicated generally at 10, for transporting heavy and bulky objects 12. The transport system 10 of the present invention readily enhances workplace and home safety.

The transport system 10 of the present invention is a wheeled platform system consisting of a first plate 14 spaced from a second plate 16 by a first side wall 18 and a second side wall 20. The first plate 18 has a first side 22 and a second side 24 and the second plate 16 has a first side 26 and a second side 28 with the second side 24 of the first plate 14 facing the first side 26 of the second plate 16. Preferably, the first plate 14 and the second plate 16 are rectangular having the same dimensions. In addition, preferably, both sides of the first plate 14 and the second plate 16 are substantially flat and planar with the first side 22 of the first plate 14 serving as the platform area for items 12 that are transported. Also, preferably, the first side wall 18 and the second side wall 20 are both substantially perpendicular to the first plate 14 and the second plate 16 thereby maintaining the first plate 14 substantially parallel to the second plate 16.

In addition, the transport system 10 of the present invention has a series of swivel-mounted, die-cast wheels 30 mounted to the second side 28 of the second plate 16. In a preferred embodiment, the transport system 10 includes four wheels 30 with a single wheel 30 mounted in each corner of the second plate 16 thereby allowing maximum stability while transporting items or objects 12 thereon. It is also within the scope of the present invention to have more than four wheels 30 depending on the size of the transport system 10 and the weight of the item or object 12 being transported. The wheels 30 preferably measure approximately four (4") inches to five (5") inches in diameter and swivel 360° allowing a user to easily move and steer the transport system 10 in any desired direction.

The transport system 10 of the present invention further includes a strap system comprising a strap 32 and a strap tensioning device 34 for releasably securing the strap 32 in a desired position. In a preferred embodiment, the strap 32 is a canvas strap although using other types of straps is within the scope of the present invention.

The strap tensioning device 34 of the strap system of the transport system 10 of the present invention includes a threaded shaft 36 having a first end and a second end. A tension knob 38 is secured to the first end of the threaded shaft 36 and a tension plate 40 is secured to the second end of the threaded shaft 36. The tension plate 40 is preferably rubber coated thereby providing greater friction when tightened against the strap 32, as will be described in further detail below.

The threaded shaft 36 of the strap tensioning device 34 of the transport system 10 of the present invention extends through a threaded aperture 42 formed in the second plate 16 such that the tension plate 40 is positioned between the first plate 14 and the second plate 16. Preferably, the threaded aperture 42 is formed in the approximate center of the second plate 16 although forming the threaded aperture 42 in another location is within the scope of the present invention.

As an additional consideration, rubber wedges can be included on any side of the transport system 10 of the present invention for added stability when stacking items or objects thereon. A convenient handle or sturdy ring is provided on each wedge enabling the user to remove or pull out the wedges when necessary.

The manner of use of the transport system 10 of the present invention will now be described. It will be understood by those skilled in the art that the manner of use of the transport system 10 described herein is merely one method of use and other methods of use of the transport system 10 are within the scope of the present invention.

Use of the transport system 10 of the present invention is very simple and straightforward. By way of example, a user has purchased a thirty-two inch television and a large TV table. To easily transport these items to the customer's vehicle, store personnel need only use the transport system. With the transport system 10, the items 12 are gingerly placed onto the first side 22 of the first plate 14. The strap 32 is positioned around the item 12 or object and between the tension plate 40 and the second side 24 of the first plate 14 wherein the tension knob 38 is tightened thereby releasably capturing the strap 32 between the tension plate 40 and the second side 24 of the first plate 14 and securing the item or object 12 to the transport system 10. Pushing or pulling the transport system 10, the items 12 are transported to the waiting vehicle. After use, the transport system 10, still assembled, is stored away until needed again.

There are several significant benefits and advantages associated with the transport system 10 of the present invention. Foremost, the transport system 10 provides a convenient and safe means of transporting and transferring heavy items 12. The transport system 10 allows users to place bulky and cumbersome objects 12 on a platform that is close to the ground. As a result, muscle strains and serious back injuries can be avoided, resulting in a safer work environment. Universal in design, the transport system 10 is an ideal addition to virtually any business that deals with moving and transport on a daily basis, from specialty stores that sell furniture and electronics to large department stores and warehouses. In addition, the transport system 10 is beneficial for home use as well, to move large items from the car to the house or to transfer objects within the home or garage.

The transport system 10 of the present invention readily enhances workplace safety. Extremely easy to assemble and operate, the transport system 10 offers a means of transporting and transferring heavy objects 12 with little effort required of the user. The swivel mounted wheels also allow the user to maneuver the transport system 10 in any direction. Alternately, a plurality of transport systems 10 can be used together with one under each corner of the item or object 12 being transported.

The foregoing exemplary descriptions and the illustrative preferred embodiments of the present invention have been explained in the drawings and described in detail, with varying modifications and alternative embodiments being taught.

While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A transport system for transporting an item, the transport system comprising:
    a first plate having a first side and a second side;
    a second plate having a first side and a second side, the second plate spaced from the first plate, the first side of the second plate facing the second side of the first plate;
    a first side wall mounted between the first plate and the second plate;
    a second side wall spaced from the first side wall and mounted between the first plate and the second plate;
    a sleeve opening created by the first plate, the second plate, the first side wall, and the second side wall;
    a plurality of wheels mounted to the second side of the second plate;
    a strap positionable around the item and within the sleeve opening; and
    a tensioning device movable within the sleeve opening for releasably securing the strap between the tensioning device and the second side of the first plate, the tensioning device comprising:
        a threaded shaft having a first end and a second end;
        a tension knob secured to the first end of the threaded shaft; and
        a tension plate is secured to the second end of the threaded shaft;
    wherein upon positioning the item on the first side of the first plate, the strap releasably secures the item to the transport system;
    wherein the threaded shaft extends through a threaded aperture formed in the second plate; and
    wherein the tension plate is movable within the sleeve opening for releasably securing the strap between the tensioning device and the second side of the first plate.

2. The transport system of claim 1 wherein the first plate and the second plate have the same dimensions.

3. The transport system of claim 1 wherein both sides of the first plate and the second plate are substantially flat and planar.

4. The transport system of claim 1 wherein the first side wall and the second side wall are both substantially perpendicular to the first plate and the second plate thereby maintaining the first plate substantially parallel to the second plate.

5. The transport system of claim 1 wherein the wheels are swivel-mounted, die-cast wheels.

6. The transport system of claim 1 and further comprising:
    four wheels with a single wheel mounted in each corner of the second plate.

7. The transport system of claim 1 wherein the threaded aperture is formed in the approximate center of the second plate.

8. The transport system of claim 1 wherein the tension plate is rubber coated.

9. A method for constructing a transport system for transporting an item, the method comprising:
    providing a first plate having a first side and a second side;
    providing a second plate having a first side and a second side;

spacing the second plate from the first plate;
facing the first side of the second plate toward the second side of the first plate;
mounting a first side wall between the first plate and the second plate;
mounting a second side wall between the first plate and the second plate;
spacing the first side wall from the second side wall;
creating a sleeve opening by the first plate, the second plate, the first side wall, and the second side wall;
mounting a plurality of wheels to the second side of the second plate;
positioning a strap around the item and within the sleeve opening;
providing a threaded shaft having a first end and a second end;
securing a tension knob to the first end of the threaded shaft;
securing a tension plate is to the second end of the threaded shaft;
extending the threaded shaft through a threaded aperture formed in the second plate;
moving the tension plate within the sleeve opening thereby releasably securing the strap between the tensioning device and the second side of the first plate; and
releasably securing the strap between the tensioning device and the second side of the first plate.

10. The method of claim 9 wherein the first plate and the second plate have the same dimensions.

11. The method of claim 9 wherein both sides of the first plate and the second plate are substantially flat and planar.

12. The method of claim 9 wherein the first side wall and the second side wall are both substantially perpendicular to the first plate and the second plate, and further comprising:
maintaining the first plate substantially parallel to the second plate.

13. The method of claim 9 wherein the wheels are swivel-mounted, die-cast wheels.

14. The method of claim 9 and further comprising:
providing four wheels with a single wheel mounted in each corner of the second plate.

15. The method of claim 9 and further comprising:
forming the threaded aperture in the approximate center of the second plate.

16. The method of claim 9 wherein the tension plate is rubber coated.

* * * * *